May 28, 1929. W. A. GILMARTIN 1,715,230
METHOD OF PRODUCING MOTION PICTURES
Filed Nov. 22, 1923 3 Sheets-Sheet 1

WITNESSES

INVENTOR
WILLIAM A. GILMARTIN
BY
ATTORNEYS

May 28, 1929.                W. A. GILMARTIN                1,715,230
                    METHOD OF PRODUCING MOTION PICTURES
                         Filed Nov. 22, 1923          3 Sheets-Sheet 2

WITNESSES

INVENTOR
WILLIAM A. GILMARTIN
BY
ATTORNEYS

May 28, 1929.  W. A. GILMARTIN  1,715,230
METHOD OF PRODUCING MOTION PICTURES
Filed Nov. 22, 1923  3 Sheets-Sheet 3

WITNESSES

INVENTOR
WILLIAM A. GILMARTIN
BY

ATTORNEYS

Patented May 28, 1929.

1,715,230

UNITED STATES PATENT OFFICE.

WILLIAM A. GILMARTIN, OF BROOKLYN, NEW YORK.

METHOD OF PRODUCING MOTION PICTURES.

Application filed November 22, 1923. Serial No. 676,411.

My invention relates to the production of motion pictures in which drawn cartoons, industrial subjects, or the like, are combined with photographically produced scenes of motion pictures.

The general object of my invention is to produce motion pictures in which drawn figures or objects are properly coordinated with photographically produced motion picture scenes, as well as to provide a method which reduces to the minimum the number of steps and number of drawings required to be made in incorporating the cartoons or other drawn figures or objects with the motion picture scenes.

The nature of my invention and its distinguishing characteristics will clearly appear as the description proceeds.

Reference is to be had to the accompanying drawings, in which similar reference characters indicate corresponding parts in all the views.

Figure 2:
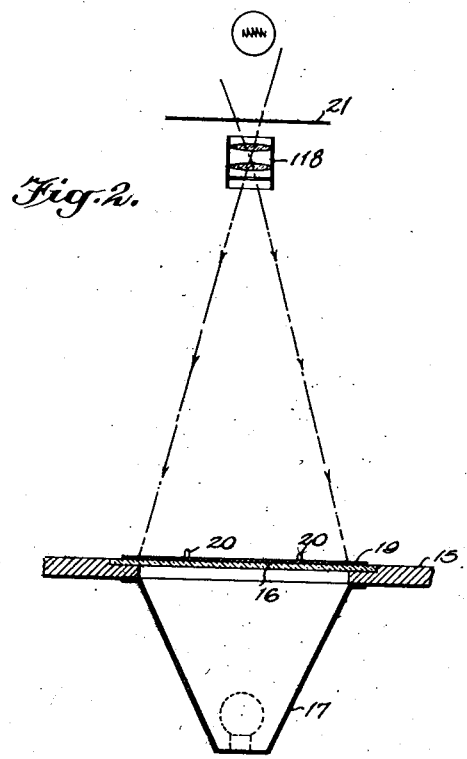
Figure 2 shows in vertical section the assemblage for projecting a picture onto the face of drawing paper for the making of a drawing of the character or other object to be filmed
Figure 3:
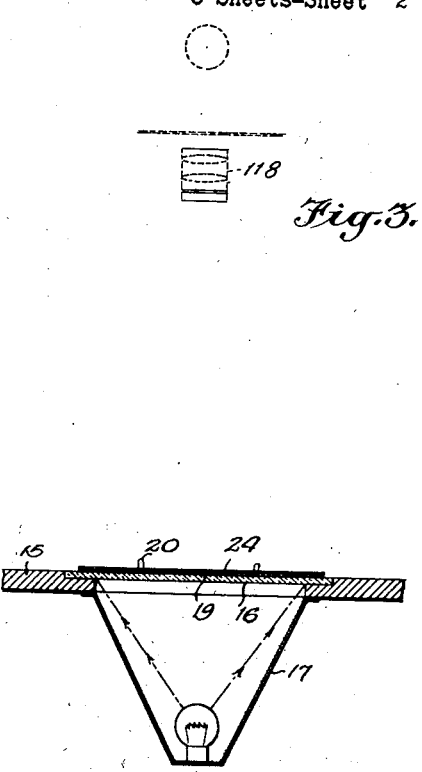
Figure 3 shows the assemblage of Figure 2 with the projecting light extinguished and the light beneath the paper functioning for the re-drawing on celluloid of the character or the object.
Figure 5:
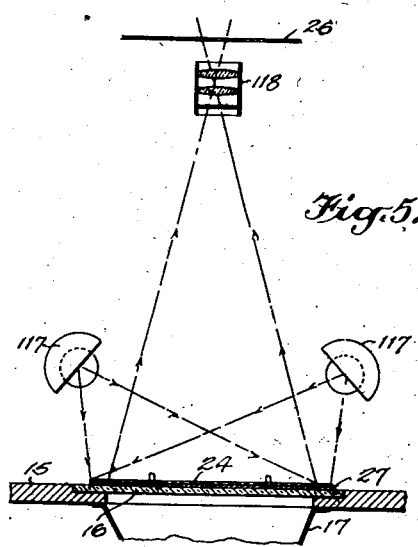
Figure 5 shows the assemblage for producing on the silhouette by reflected light the surface details of the drawing after removal of the picture bearing film employed in the projecting step of Figure 2 and in the printing step of Figure 4.

In producing motion pictures in accordance with my invention, I employ a table 15 having a translucent glass 16, said table being equipped with suitable lighting means beneath said glass 16, said lighting means being conventionally indicated at 17. Projecting apparatus conventionally shown at 18 and the lens assemblage of which is shown at 118 in Figures 2 and 5 is employed.

In carrying out the first step of my improved method I place on the table 15 over the glass 16 a sheet of drawing paper 19, the table being equipped with registering pins 20 by which the paper and celluloid sheet hereinafter explained are assured registering positions. The projecting apparatus 18 is now employed to project from a positive film 21 conventionally shown in Figures 2 and 4, a picture onto the drawing paper 19, it being understood that any suitable film 21 produced by usual methods may be utilized.

I now, as a second step, draw objects 22, 23, here consisting of a figure of a man and a figure of a dog on the paper 19 being guided for properly positioning the figures 22, 23 by the elements projected onto the drawing paper 19 by the projector 18.

Figure 6:
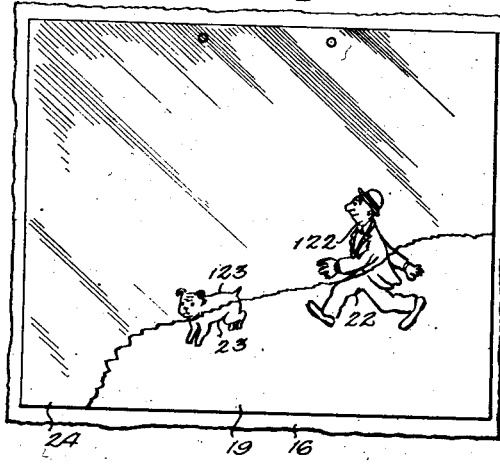
Figure 6 is a plan view with part broken away illustrating an imposed drawing on celluloid and a drawing on paper in register with the first-mentioned drawing.

Having produced on the paper 19 the drawing with the figures 22, 23, I now produce, as a third step, on a sheet of transparent celluloid 24, figures 122, 123 corresponding in all respects with figures 22, 23 and in exact register therewith as will be clear from Figure 6.

Figure 7:
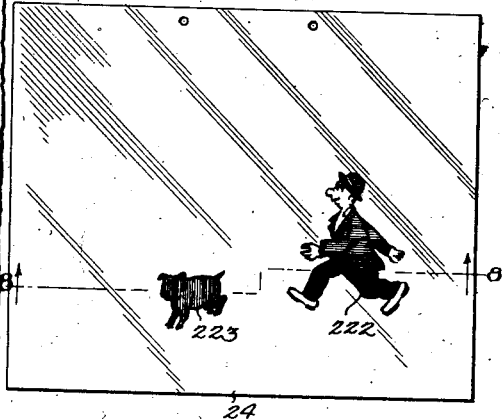
Figure 7 is a plan view of the celluloid drawing opaqued.
Figure 8:
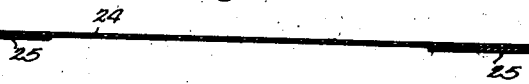
Figure 8 is an enlarged transverse section as indicated by the line 8—8, Figure 7.

As a fourth step said figures 122, 123 are now opaqued at the back thereof by applying any suitable opaque material 25 thereto, the opaqued figures being shown in Figure 7 and the opaque material being conventionally indicated in cross section in Figure 8. The opaqued figures are designated respectively 222, 223 in Figure 7.

Figure 4:
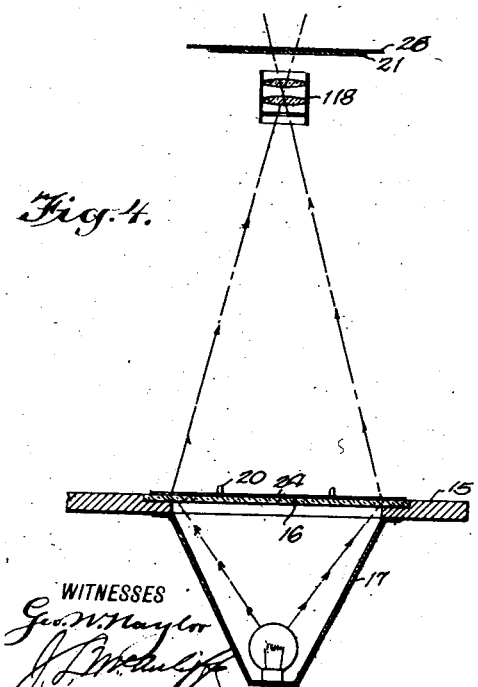
Figure 4 shows the assemblage for the printing of the picture used in the step of Figure 2 and a simultaneous printing of a silhouette of the opaqued drawing.
Figure 9:
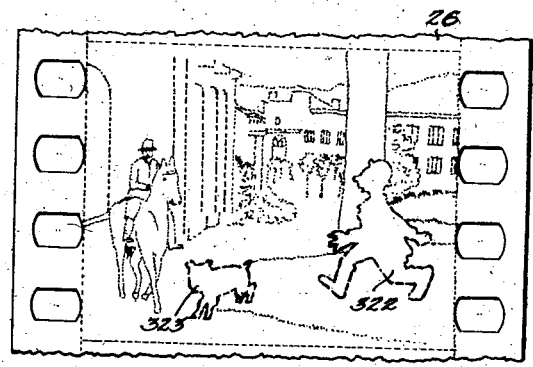
Figure 9 represents a section of the sensitive film or negative produced by my method after an exposure of the silhouetted and opaqued drawing in association with the picture originally projected on the drawing paper showing said negative in its undeveloped condition.

I now proceed as a fifth step in my method to obtain a print on a sensitized strip or negative incorporating in the print both the picture originally projected on the paper 19 from the positive and silhouettes of the opaqued figures 22, 223 for which purpose the celluloid sheet 24 with the opaqued drawn objects thereon is placed on the translucent table glass 16, the pins 20 being utilized to insure registering between the celluloid sheet as thus positioned and the original positioning of the projected picture and drawing paper 19. The projecting apparatus 18 is here utilized as a camera, there being placed in the said apparatus in addition to the original positive film 21 a sensitive film 26 for the production of a negative. The under side of the glass 16 is now illuminated by the light means 17 so that the light will pass through the glass 16 through the celluloid sheet 24, except at the opaqued figures thereon, through the lens assemblage 118 and through the positive film 21 to the sensitive strip 26. Since the picture film 21 is present in the apparatus 18 now acting as a camera and under the same conditions under which the picture was projected from said film onto the drawing paper 19, it will be obvious that the exposure of the sensitive strip 26 by the step of printing will include the original projected picture on the film 21 and silhouettes of the opaqued figures 222, 223 in the exact relative positions occupied by the picture and drawn figures on the drawing paper 19. The print on the negative combining the silhouettes and the picture is indicated in Figure 9. The mere production of a silhouette in association with the motion picture is not, however, sufficient to complete the produced motion picture including the drawn figures, hence I complete, as a sixth, or final, step the incorporating in the negative the details, surface lines, expression, etc., appearing on the surface of the drawn object or objects, for which purpose the celluloid sheet 24 with the opaque figures thereon is permitted to remain in situ on the table glass 16 and the illumination beneath the table is cut off. The film strip 21 which is shown in Figure 4 in association with the sensitive strip 26 in carrying out the printing operation is now removed from the apparatus 18, leaving only the sensitive strip 26 or negative with the exposure indicated in Figure 9 thereon. Lights 117 above the table 15 are now caused to illuminate the celluloid sheet 24 on the table glass 16 as in Figure 5 so that there will be photographically produced an exposure on sensitive strip 26 and imposed on the first exposure a second exposure to incorporate the details and surface lines of the opaqued figures 222, 223.

In making the described second exposure without an intervening advance or movement of the sensitive film strip 26, said second exposure is made in exact register as regards its position with the position occupied by the drawing on the celluloid sheet 24 in jointly printing the silhouette and motion picture. Furthermore, the second exposure or photographic incorporating of the details and surface lines of the drawing is effected in exact register with the printed silhouette of the drawing obtained by the first exposure or printing step. Therefore, it will be clear that I now have on the sensitive film, exposures including (1) the silhouette of the drawn picture on the celluloid sheet with (2) the associated motion picture subject, both obtained by simultaneous printing of said silhouette of the drawn picture and the printing of the film strip or positive previously used in projecting the picture on the drawing paper; and (3) the details, surface lines, expression, etc. of the drawing, due to the second exposure obtained by photography.

Figure 1:
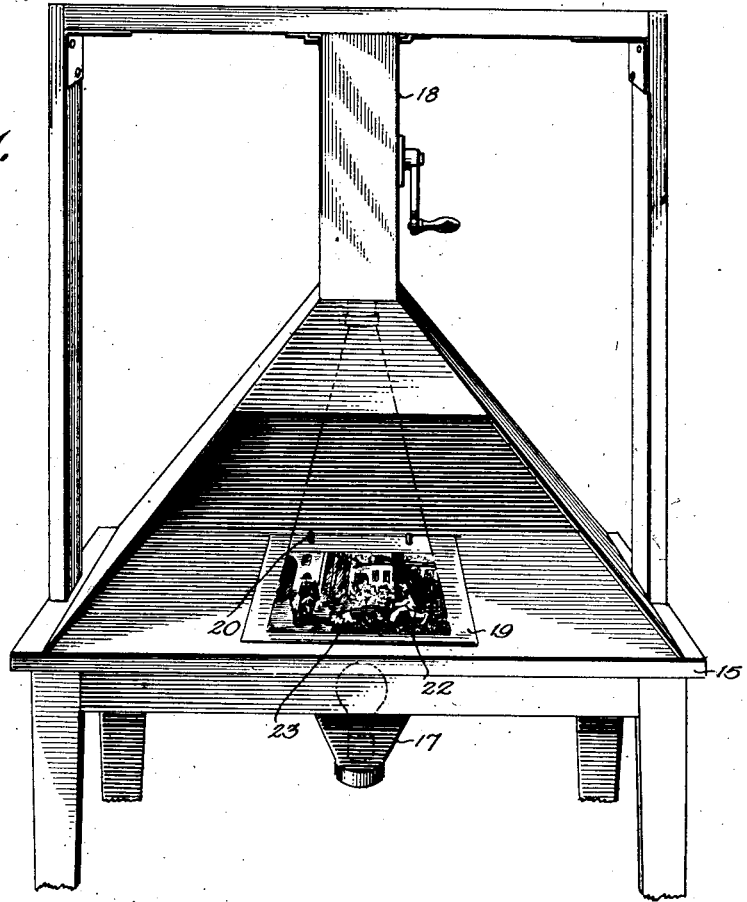
Figure 1 is a perspective view indicating a projected picture on drawing paper and objects drawn in position to coordinate them with the elements of the projected picture.
Figure 10:
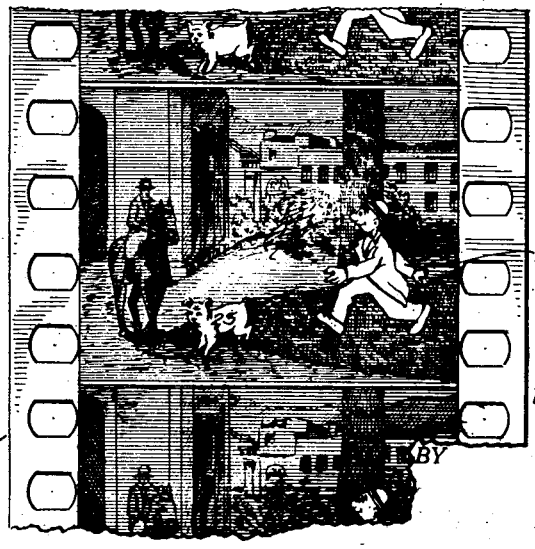
Figure 10 is a plan view of a section of a positive print made from the finished negative film.

The successive pictures of the original motion picture strip 21 are produced on the negative in the same manner, each picture on the negative being produced by the steps defined for producing the first picture. The negative is finally developed and fixed and the resulting positive shown in Figure 10 is produced, adapted to be used for the projection of the produced pictures combining the drawing and the pictures of the original film positive. Obviously, the produced pictures may embody any selected motion picture subject with a series of cartoons or other series of drawn objects such as objects pertaining to industrial subjects, medical subjects, etc.

In photographing the opaqued objects on the celluloid or equivalent transparent sheet 24, a sheet of suitable dark material 27 is placed on the table glass 16 beneath said transparent sheet in order to prevent halation and to prevent reflected light from the area surrounding the drawn and opaqued figure on the celluloid sheet 24 from affecting the sensitive film 26 where it has previously been affected by the reproduction or printing of the positive film 21.

I would state in conclusion that while the given illustration constitutes a practical example for the carrying out of my invention, it will be understood that variation may be made without departure from the spirit of the invention as defined in the appended claims.

Having thus described my invention, I claim:

1. In a method of producing motion pictures, projecting in succession onto successive sheets of drawing paper pictures from a motion picture film, producing on each sheet of drawing paper while the pictures are projected drawn objects in predetermined positions relatively to the objects in the projected picture, re-drawing on sheets of transparent material the said objects drawn on the sheets of paper, opaquing the objects drawn on the transparent sheets at the backs of said objects, printing on a sensitized strip a portion of each frame of said film by exposure to light transmitted through the said transparent sheets while said sheets are in the position occupied originally by the drawing paper and while said film is in the position it occupied when the picture was projected for the making of the drawing, the opaqued object on said transparent sheet acting as a mask and producing an unexposed silhouetted area, and then exposing the complementary picture on the transparent sheet onto the unexposed part of the sensitized film by reflected light.

2. In a method of producing motion pictures from a picture film and drawings, subjecting a sensitized strip to a first exposure by light transmitted through a transparent sheet containing an object drawn in a predetermined position and opaqued at the back, said exposure comprising a portion of the picture on the film and a silhouetted area of unexposed sensitized film; the opaqued drawn object acting as a mask for the silhouetted area, and then subjecting the unexposed silhouetted area to an exposure by reflected light to photographically obtain the details and surface lines of the object of the drawing.

3. In a method of producing motion pictures from the pictures on a motion picture film and from drawings; projecting onto drawing paper a picture on the film, producing drawn objects on the transparent sheets in predetermined relation to the objects in the projected picture, and then producing a negative by exposing to transmitted light a sensitized strip in contact with the film while said film is in the position in which its picture was projected, and an exposure by reflected light with the drawing in register with the position it occupied when the picture was projected.

4. In a method of producing motion pictures from the pictures on a motion picture film and from drawings; projecting onto drawing paper a picture on the film producing drawn objects in predetermined relation to the objects in the projected picture, redrawing the said objects on sheets of transparent material and opaquing said sheets at the back of the drawn objects, using the said transparent sheets containing the opaqued objects first to mask a portion of each frame of the sensitized strip while printing the complementary portion by transmitted light, and secondly to affect the formerly unexposed portion by reflected light.

5. In a method of producing motion pictures from the pictures on a motion picture film and from drawings; projecting onto drawing paper a picture on the film, drawing objects on said paper while the picture is projected thereon in a predetermined relation to the objects in the projected picture, drawing on a transparent sheet the objects drawn on said paper and in precise register with the objects on the said paper, opaquing the objects on the transparent sheet at the back, and then producing a negative by selectively subjecting a sensitized strip to an exposure first by transmitted light and subsequently by reflected light, in the alternate use of the transparent sheet having a dual function; namely, in the first instance to act as a mask and secondly to affect the formerly unexposed complementary portion of the sensitized strip.

WILLIAM A. GILMARTIN.